(12) United States Patent
Lu et al.

(10) Patent No.: US 12,153,142 B2
(45) Date of Patent: Nov. 26, 2024

(54) MICRO SHUTTER ARRAY FOR LIDAR SIGNAL FILTERING

(71) Applicant: BEIJING VOYAGER TECHNOLOGY CO., LTD., Beijing (CN)

(72) Inventors: Yue Lu, Los Gatos, CA (US); Youmin Wang, Berkeley, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 271 days.

(21) Appl. No.: 17/699,615

(22) Filed: Mar. 21, 2022

(65) Prior Publication Data

US 2023/0176220 A1  Jun. 8, 2023

Related U.S. Application Data

(63) Continuation-in-part of application No. 17/544,925, filed on Dec. 7, 2021, and a continuation-in-part of application No. 17/544,923, filed on Dec. 7, 2021.

(51) Int. Cl.
*G01S 17/89* (2020.01)
*G01S 7/481* (2006.01)

(52) U.S. Cl.
CPC ............ *G01S 17/89* (2013.01); *G01S 7/4816* (2013.01); *G01S 7/4817* (2013.01)

(58) Field of Classification Search
CPC .. G02B 26/02; G02B 6/3518; B81B 2201/042
See application file for complete search history.

(56) References Cited

FOREIGN PATENT DOCUMENTS

KR    101588000 B1 *  8/2009  ............. G02B 26/02

OTHER PUBLICATIONS

Takahide Mizuno, "Two Dimensional Scanning LIDAR for Planetary Explorer", 2006 hereafter Mizuno (Year: 2006).*
Mary M. Ledet, "Utilizing micro-electro-mechanical systems (MEMS) micro-shutter designs for adaptive coded aperture imaging (ACAI) technologies", 2009 (Year: 2009).*
Xuehui Wang, "Scene-adaptive coded aperture imaging" Jun. 2017 (Year: 2017).*

* cited by examiner

*Primary Examiner* — Maurice C Smith
(74) *Attorney, Agent, or Firm* — BAYES PLLC

(57) ABSTRACT

Embodiments of the disclosure provide a micro shutter array, and an optical signal filtering method. The micro shutter array is used for filtering a series of optical signals at a plurality of time points. The optical signal at each time point includes a laser beam. The micro shutter array includes a plurality of micro shutter elements arranged in an array and a driver. The driver is configured to sequentially open a subset of the micro shutter elements at a specified location at each time point to allow a respective laser beam to pass through the micro shutter array at that time point.

19 Claims, 11 Drawing Sheets

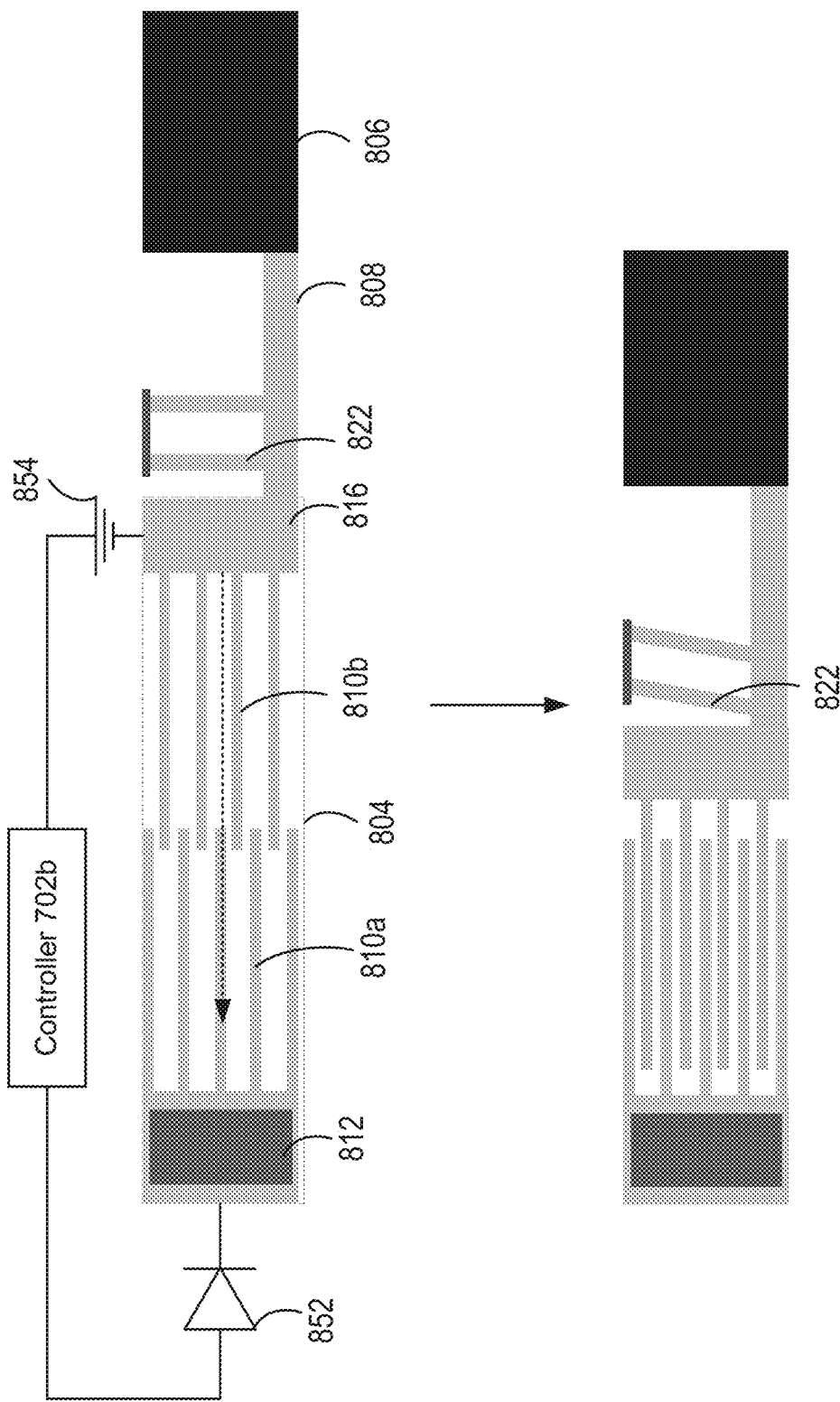

MICRO SHUTTER ARRAY FOR LIDAR SIGNAL FILTERING

CROSS-REFERENCE OF RELATED APPLICATIONS

This is a continuation-in-part of U.S. application Ser. No. 17/544,923 filed Dec. 7, 2021, and also a continuation-in-part of U.S. application Ser. No. 17/544,925 filed Dec. 7, 2021, both of which are incorporated in reference herein in their entireties.

TECHNICAL FIELD

The present disclosure relates to a light detection and ranging (LiDAR) system and more particularly to, a micro shutter array used in a receiver of a LiDAR system to filter laser beams returned from the environment.

BACKGROUND

In a scanning LiDAR system, biaxial architecture has some advantages such as simpler optics, less limitation on a scanner, and a larger aperture which is not limited to the scanner size. One advantage of the biaxial architecture is that the field of view (FOV) of the receiving optics can be quite large to cover all scanned points in the far field. However, if the receiving optics of a LiDAR system is made to be large, in real-world applications, a lot of ambient light, such as light from the direct or indirect sunlight reflected off far-field objects, may be also collected by the receiving optics simultaneously. The larger the receiving optics FOV, the more received ambient light, which means the more noise for backend processing and thus the lower detection accuracy. Therefore, there is a trade-off between the receiving optics FOV that affects the detection range and the signal-to-noise ratio that affects the detection accuracy in existing biaxial scanning LiDAR systems, thereby limiting the performance of the existing biaxial scanning LiDAR systems.

In addition, in the existing biaxial scanning LiDAR systems, the ambient light is generally considered as noise if the ambient light is detected along with the retuned laser beams during optical signal detection. However, the ambient light reflected off far-field objects may itself contain information of the far field, which is useful for object detection. By considering the ambient light as mere noise, the existing biaxial scanning LiDAR systems waste useful information contained in the ambient light, which again limits the performance of the existing biaxial scanning LiDAR systems.

Embodiments of the disclosure address the above problems by including a micro shutter array for filtering the laser beams when detecting the optical signals in a biaxial scanning LiDAR system.

SUMMARY

Embodiments of the disclosure provide an exemplary micro shutter array for filtering a series of optical signals at a plurality of time points. The optical signal at each time point includes a laser beam. The micro shutter array includes a plurality of micro shutter elements arranged in an array and a driver. The driver is configured to sequentially open a subset of the micro shutter elements at a specified location at each time point to allow a respective laser beam to pass through the micro shutter array at that time point.

Embodiments of the disclosure also provide an exemplary optical signal filtering method. The method includes receiving, at a micro shutter array, a series of optical signals at a plurality of time points. The optical signal at each time point includes a laser beam. The micro shutter array includes a plurality of micro shutter elements arranged in an array and a driver configured to drive the plurality of micro shutter elements. The method further includes sequentially opening, by the driver, a subset of the micro shutter elements at a specified location at each time point, to allow a respective laser beam to pass through the micro shutter array at that time point.

Embodiments of the disclosure further provide an exemplary receiver for optical sensing. The exemplary receiver includes a micro shutter array configured to filter a series of optical signals at a plurality of time points. The optical signal at each time point includes a laser beam. The micro shutter array includes a plurality of micro shutter elements arranged in an array and a driver. The driver is configured to sequentially open a subset of the micro shutter elements at a specified location at each time point to allow a respective laser beam to pass through the micro shutter array at that time point. The receiver further includes a photodetector configured to detect the laser beam that passes through the micro shutter array at each time point.

It is to be understood that both the foregoing general description and the following detailed description are exemplary and explanatory only and are not restrictive of the present disclosure, as claimed.

BRIEF DESCRIPTION OF THE DRAWINGS

FIG. 8B illustrates a schematic diagram of an exemplary switching mechanism of a micro shutter element, according to embodiments of the disclosure.

DETAILED DESCRIPTION

Figure 1:
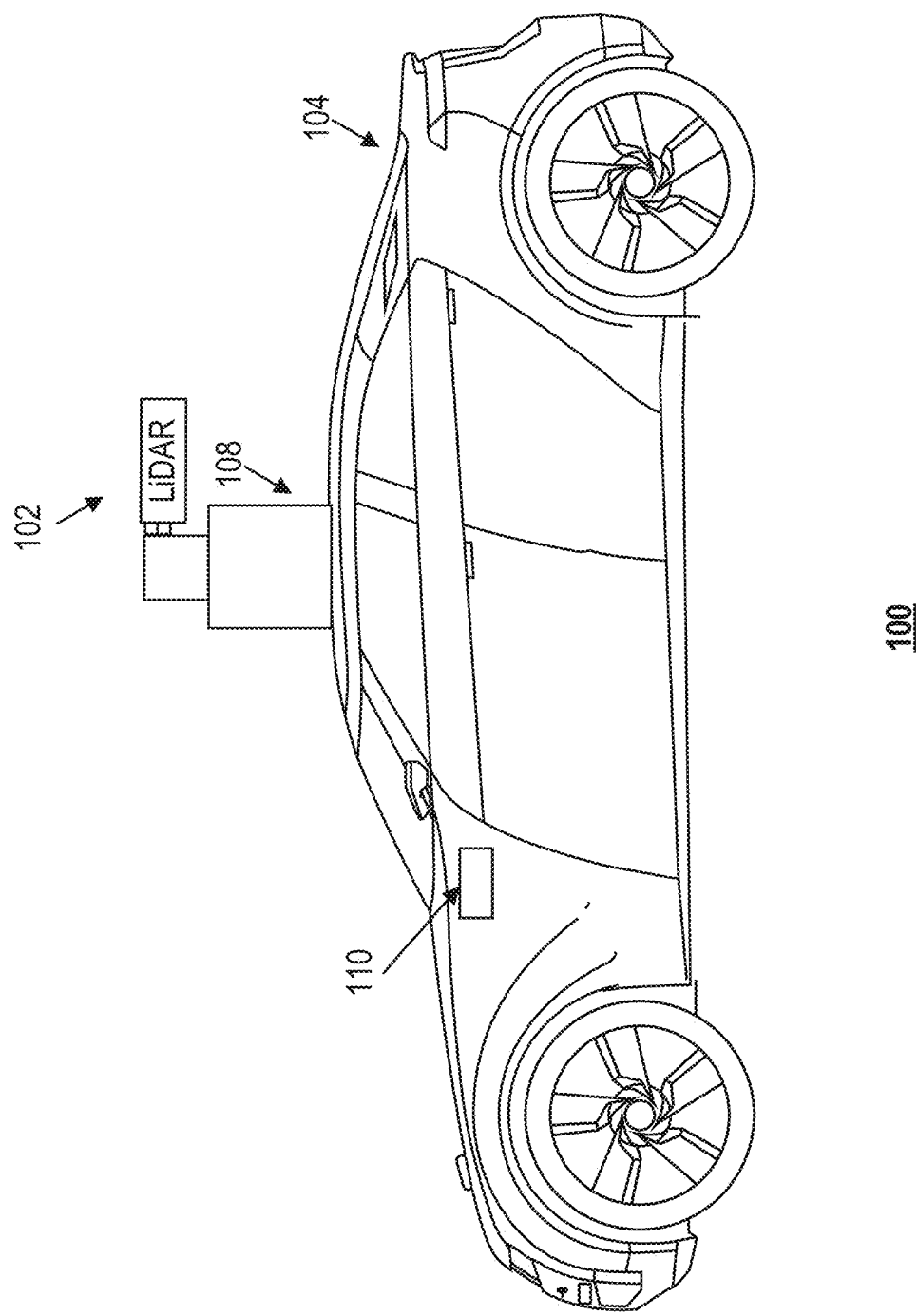
FIG. 1 illustrates a schematic diagram of an exemplary vehicle equipped with a LiDAR system containing a micro shutter array and an image sensor, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide a micro shutter array in a receiver of a biaxial scanning LiDAR system. According to one example, the micro shutter array may be disposed between a receiving lens and a condenser lens of the receiver. The micro shutter array may include a plurality of micro shutter elements arranged in a one-dimensional, two-dimensional, or three-dimensional array, where each micro shutter element may be controlled to switch between an open and closed state. Accordingly, when an optical signal returned from the environment of the LiDAR system is received by the receiver in a biaxial scanning LiDAR system, the micro shutter array may be controlled to allow only a spatially selected portion to be opened, to allow the returned optical signal to pass through the spatially selected portion of the micro shutter array and detected by a photodetector of the receiver.

In some embodiments, the spatially selected portion is selected based on the location where the returned optical signal is incident on the micro shutter array after collimation by the receiving lens, where the incident location of the returned optical signal is also determined by the angular direction at which a scanner of the LiDAR system is pointing during a scanning process. Accordingly, when the scanner of the LiDAR system scans the environment by continuously changing the angular direction, the location where the returned optical signal is incident on the micro shutter array may also continuously change, and the changing pattern may correspond to a pattern that the scanner of the LiDAR system follows during the scanning process. To allow the returned optical signals to pass through the micro shutter array, the micro shutter array may be controlled to sequentially open different portions of the micro shutter array, where each portion is spatially selected based on the location where the returned optical signal is incident on the micro shutter array.

In some embodiments, the micro shutter array may be coated with a reflective material that has a high reflectivity. Accordingly, the micro shutter array reflects signals incident on it unless a certain portion is open. By controlling the micro shutter array to sequentially open only a spatially selected portion at each time point during a scanning process, the majority portion of the micro shutter array remains closed during the scanning process. Therefore, the majority of the ambient light, including the direct or indirect sunlight reflected off far-field objects, may be reflected back without passing through the micro shutter array for detection by the photodetector of the LiDAR system. This then allows the signal-to-ratio to remain high for the photodetector of the LiDAR system, even when the receiving optics FOV is large. That is, the detection range of the disclosed biaxial scanning LiDAR system can be increased without the sacrifice of detection accuracy of the photodetector of the LiDAR system.

In addition, the ambient light reflected off far-field objects may contain information regarding these objects, which may be useful for object detection. Accordingly, in some embodiments, the receiver of the disclosed LiDAR system may further include an image sensor (e.g., a camera sensor) that is configured to detect the majority of the ambient light reflected by the micro shutter array in the receiver. To allow the reflected ambient light to deviate from a light path of returning laser beams to be detected by the image sensor disposed off of the light path, the receiver of the disclosed LiDAR system may further include a quarter-wave plate that changes the polarization state of the ambient light passing through the plate and a beam splitter that re-directs the ambient light reflected by the micro shutter array based on the polarization state of the ambient light. The re-directed ambient light may be detected by the image sensor, which may capture the texture information of the environment including the texture information of the far-field objects in the environments. In some embodiments, the texture information of the far-field objects captured by the image sensor may be combined or fused with the depth information of the far-field objects captured by the photodetector of the LiDAR system. The integration of these attributes with an efficient fusion approach may greatly benefit the reliable and consistent perception of the environment surrounding the disclosed LiDAR system.

Other advantages of using the disclosed micro shutter array in a receiver of a LiDAR system include the easy integration of the receiver into the existing biaxial scanning LiDAR systems, without changing many of the other components, especially the transmitting part included in these LiDAR systems. The features and advantages described herein are not all-inclusive and many additional features and advantages will be apparent to one of ordinary skill in the art in view of the drawings and the following descriptions.

A LiDAR system incorporating the disclosed micro shutter array can be used in various applications, such as advanced navigation technologies to aid autonomous driving or to generate high-definition maps, in which the LiDAR system can be equipped on a vehicle.

FIG. 1 illustrates a schematic diagram of an exemplary vehicle equipped with an optical sensing system containing a micro shutter array, according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with an optical sensing system, e.g., a LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a scanning system of LiDAR system 102 may be configured to scan the surrounding environment. LiDAR system 102 measures distance to a target by illuminating the target with laser beams and measuring the reflected/scattered pulses with a photodetector of the receiver of the LiDAR system. The laser beams used for LiDAR system 102 may be ultraviolet, visible, or near-infrared, and may be pulsed or continuous wave laser beams. In some embodiments of the present disclosure, LiDAR system 102 may capture point cloud data including depth information of the objects in the surrounding environment, which may be used for constructing a high-definition map or 3-D buildings and city modeling. In some embodiments of the present disclosure, LiDAR system 102 may also include an image sensor that captures the texture information of the environment, which may be further fused with the depth information captured by the photodetector of the LiDAR system to get a better perception of the environment surrounding the disclosed LiDAR system. As vehicle 100 moves along the trajectory, LiDAR system 102 may continuously capture data including the depth information and the texture information of the surrounding objects (such as moving vehicles, buildings, road signs, pedestrians, etc.) for map, building, or city modeling construction.

Figure 2:
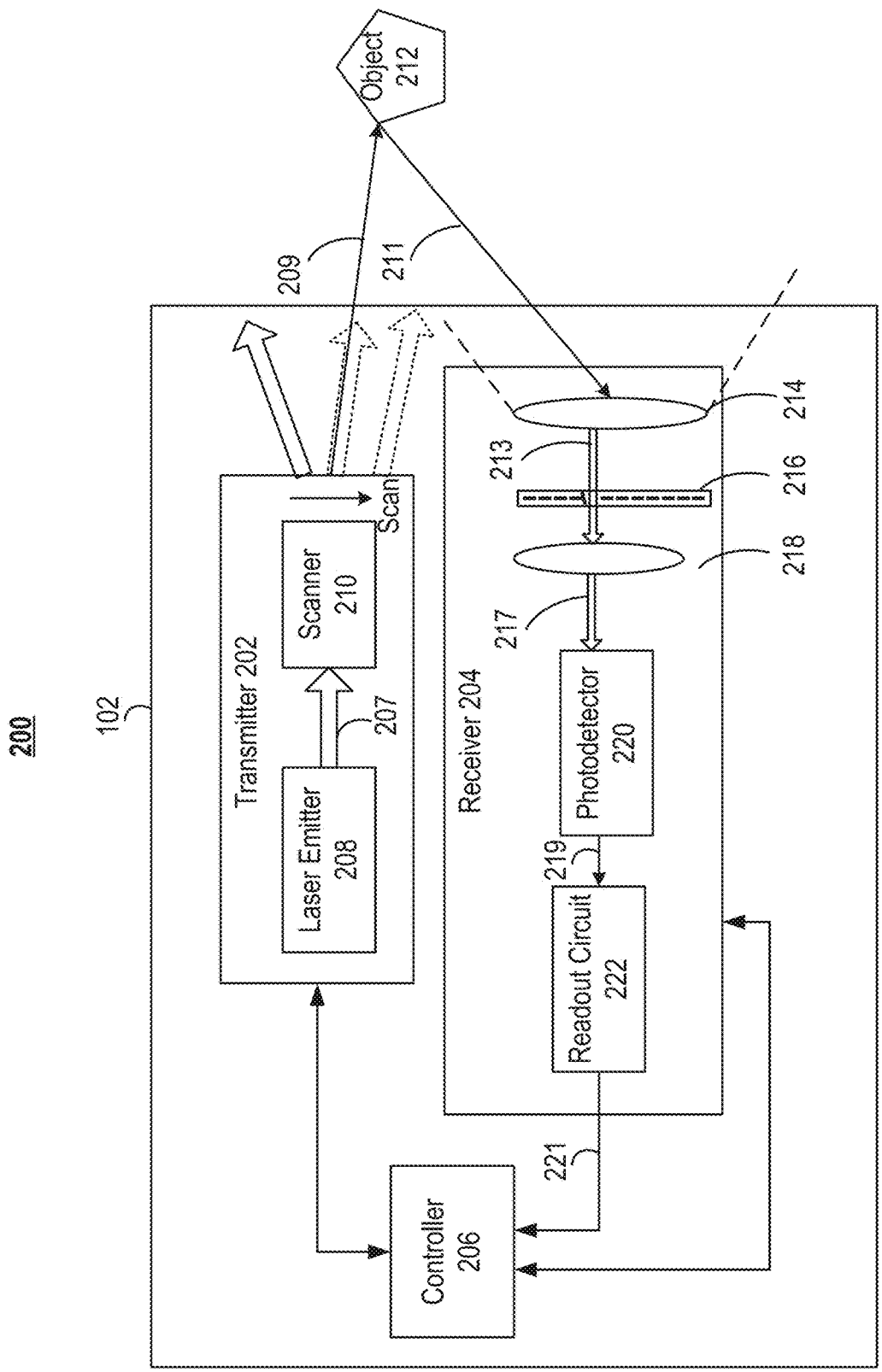
FIG. 2 illustrates a block diagram of an exemplary LiDAR system, according to embodiments of the disclosure.

FIG. 2 illustrates a block diagram of an exemplary LiDAR system, according to embodiments of the disclosure. In some embodiments, LiDAR system 102 may be a biaxial LiDAR, a semi-coaxial LiDAR, a coaxial LiDAR, a scanning flash LiDAR, etc. As illustrated, LiDAR system 102 may include a transmitter 202, a receiver 204, and a controller 206 coupled to transmitter 202 and receiver 204. Transmitter 202 may further include a laser emitter 208 for emitting a laser beam 207, and one or more optics (not shown) for collimating laser beam 207 emitted by laser emitter 208. In some embodiments, transmitter 202 may additionally include a scanner 210 for steering the collimated laser beam according to a certain pattern. Transmitter 202 may emit optical beams (e.g., pulsed laser beams, continuous wave (CW) beams, frequency modulated continuous wave (FMCW) beams) along multiple directions. Receiver 204 may further include a receiving lens 214, a micro shutter array 216, a condenser lens 218, a photodetector 220, and a readout circuit 222. Although not shown, in some embodiments, receiver 204 may further include an image sensor and other optical components, such as a beam splitter, a quarter-wave plate, and a polarizer that collaboratively redirect the ambient light for detection by the image sensor.

Laser emitter 208 may be configured to emit laser beams 207 (also referred to as "native laser beams") to scanner 210. For instance, laser emitter 208 may generate laser beams in the ultraviolet, visible, or near-infrared wavelength range, and provide the generated laser beams to scanner 210. In some embodiments of the disclosure, depending on underlying laser technology used for generating laser beams, laser emitter 208 may include one or more of a double heterostructure (DH) laser emitter, a quantum well laser emitter, a quantum cascade laser emitter, an interband cascade (ICL) laser emitter, a separate confinement heterostructure (SCH) laser emitter, a distributed Bragg reflector (DBR) laser emitter, a distributed feedback (DFB) laser emitter, a vertical-cavity surface-emitting laser (VCSEL) emitter, a vertical-external-cavity surface-emitting laser (VECSEL) emitter, an extern-cavity diode laser emitter, etc., or any combination thereof. Depending on the number of laser emitting units in a package, laser emitter 208 may include a single emitter containing a single light-emitting unit, a multi-emitter unit containing multiple single emitters packaged in a single chip, an emitter array or laser diode bar containing multiple (e.g., 10, 20, 30, 40, 50, etc.) single emitters in a single substrate, an emitter stack containing multiple laser diode bars or emitter arrays vertically and/or horizontally built up in a single package, etc., or any combination thereof. Depending on the operating time, laser emitter 208 may include one or more of a pulsed laser diode (PLD), a CW laser diode, a Quasi-CW laser diode, etc., or any combination thereof. Depending on the semiconductor materials of diodes in laser emitter 208, the wavelength of emitted laser beams 207 may be at different values, such as 760 nm, 785 nm, 708 nm, 848 nm, 870 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser emitter 208 for emitting laser beams 207 at a proper wavelength.

Scanner 210 may include various optical elements such as prisms, mirrors, gratings, optical phased array (e.g., liquid crystal-controlled grating), or any combination thereof. When a laser beam is emitted by laser emitter 208, scanner 210 may direct the emitter laser beam towards the environment, e.g., object(s) 212, surrounding LiDAR system 102. In some embodiments, object(s) 212 may be made of a wide range of materials including, for example, non-metallic objects, rocks, rain, chemical compounds, aerosols, clouds, and even single molecules. In some embodiments, at each time point during a scanning process, scanner 210 may direct laser beams 209 to object(s) 212 in a direction within a range of scanning angles by rotating a deflector, such as a micromachined mirror assembly.

Receiver 204 may be configured to detect returned laser beams 211 reflected by object(s) 212. Upon contact, laser light can be reflected/scattered by object(s) 212 via backscattering, such as Raman scattering, and fluorescence. Returned laser beams 211 may be in a same or different direction from laser beams 209. In some embodiments, receiver 204 may collect laser beams returned from object(s) 212 and output signals reflecting the intensity of the returned laser beams, as further described in detail in FIG. 3A. In some embodiments, receiver 204 may be configured to also detect the ambient light reflected off objects in the environment, and thus may capture texture information of the objects in the environment, as further described in detail in FIG. 3B.

As described above and as illustrated in FIG. 2, receiver 204 may include a receiving lens 214, a micro shutter array 216, a condenser lens 218, a photodetector 220, and a readout circuit 222. Receiving lens 214 may receive laser beams 211 returned from the environment (e.g., reflected by object(s) 212) and ambient light from the environment, and may collimate the receiving laser beams and ambient light towards micro shutter array 216. Micro shutter array 216 may reflect away the majority of the ambient light from the collimated laser beams 213, to allow only the collimated laser beams and a very limited amount of the ambient light to pass through the micro shutter array. For instance, micro shutter array 216 may open only a very small portion at a position where a returned laser beam is incident on the micro shutter array at each time point, to allow the returned laser beam and a very limited amount of the ambient light, if there is any, to pass through. Condenser lens 218 may be configured to converge and focus a passed-through laser beam on photodetector 220 as a focused spot 217.

Photodetector 220 may be configured to detect the focused laser spot 217. In some embodiments, photodetector 220 may include a single sensor element that continuously detects the focused laser spots passed through micro shutter array 216 and focused by condenser lens 218. In some embodiments, photodetector 220 may be a photosensor array that includes multiple sensor elements. Different focused laser spots 217 may be detected by different sensor elements included in the photosensor array. In some embodiments, a focused laser spot detected by photodetector 220 may be converted into an electrical signal 219 (e.g., a current or a voltage signal). Electrical signal 219 may be an analog signal which is generated when photons are absorbed in a photodiode included in photodetector 220. In some embodiments, photodetector 220 may be a PIN detector, an avalanche photodiode (APD) detector, a single photon avalanche diode (SPAD) detector, a silicon photo multiplier (SiPM) detector, or the like.

Readout circuit 222 may be configured to integrate, amplify, filter, and/or multiplex signal detected by photodetector 220 and transfer the integrated, amplified, filtered, and/or multiplexed signal 221 onto an output port (e.g., controller 206) for readout. In some embodiments, readout circuit 222 may act as an interface between photodetector 220 and a signal processing unit (e.g., controller 206). Depending on the configurations, readout circuit 222 may include one or more of a transimpedance amplifier (TIA), an analog-to-digital converter (ADC), a time-to-digital converter (TDC), or the like.

Controller 206 may be configured to control transmitter 202 and/or receiver 204 to perform detection/sensing operations. For instance, controller 206 may control laser emitter 208 to emit laser beams 207, or control photodetector 220 to detect optical signal returning from the environment. In some embodiments, controller 206 may also control data acquisition and perform data analysis. For instance, controller 206 may collect digitalized signal information from readout circuit 222, determine the depth information of object(s) 212 from LiDAR system 102 according to the travel time of laser beams, and construct a high-definition map or 3-D buildings and city modeling surrounding LiDAR system 102 based on the depth information of object(s) 212. In some embodiments, controller 206 may combine the digitalized signals from a series of laser beams passed through different portions of micro shutter array 216 in constructing a high-definition map or 3-D buildings and city modeling surrounding LiDAR system 102. In some embodiments, controller 206 may further fuse depth information included in the photodetector data with the texture information included in the image sensor data.

Figure 3A:
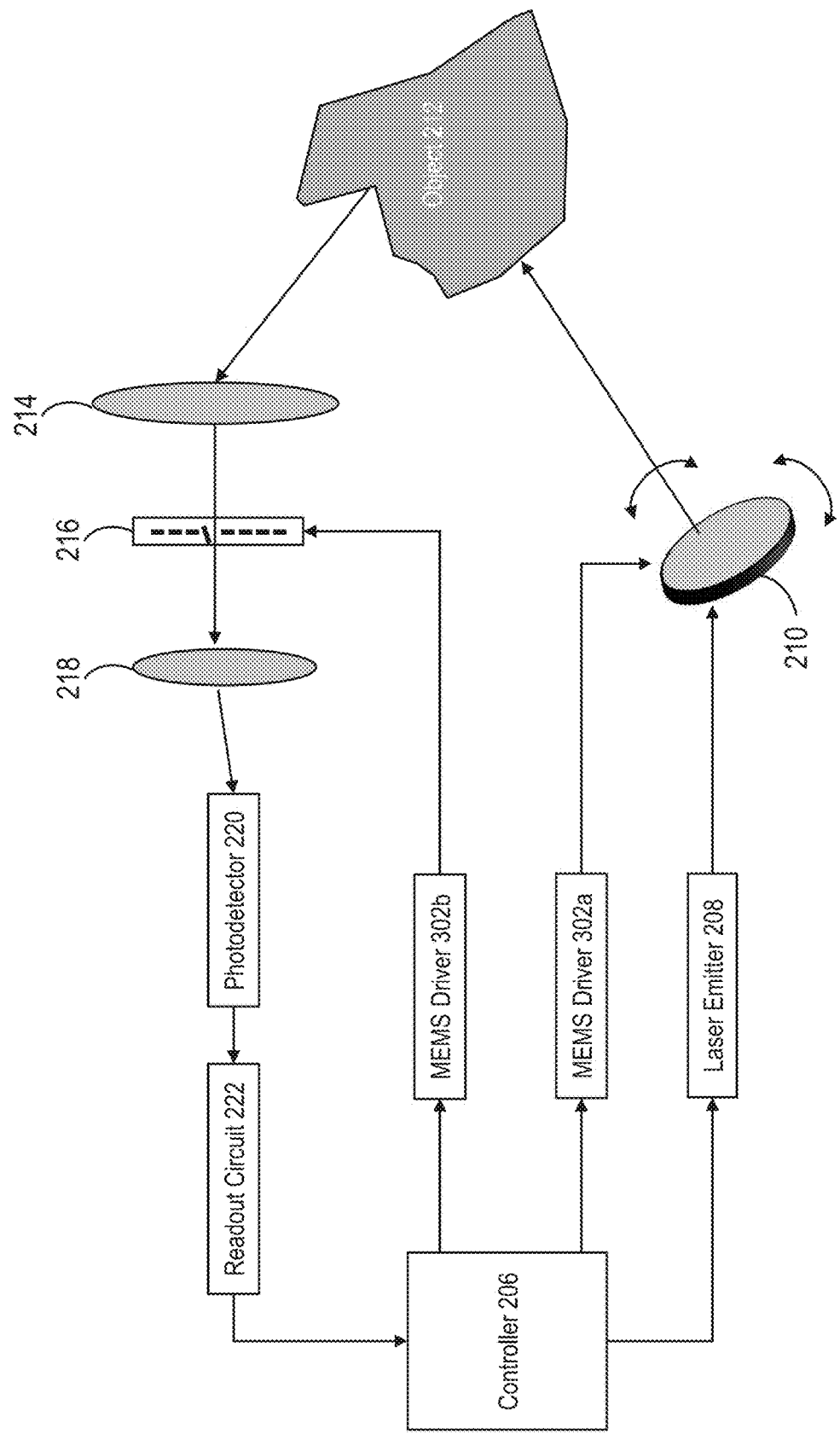
FIG. 3A illustrates a block diagram of an exemplary LiDAR system containing a micro shutter array, according to embodiments of the disclosure.
Figure 3B:
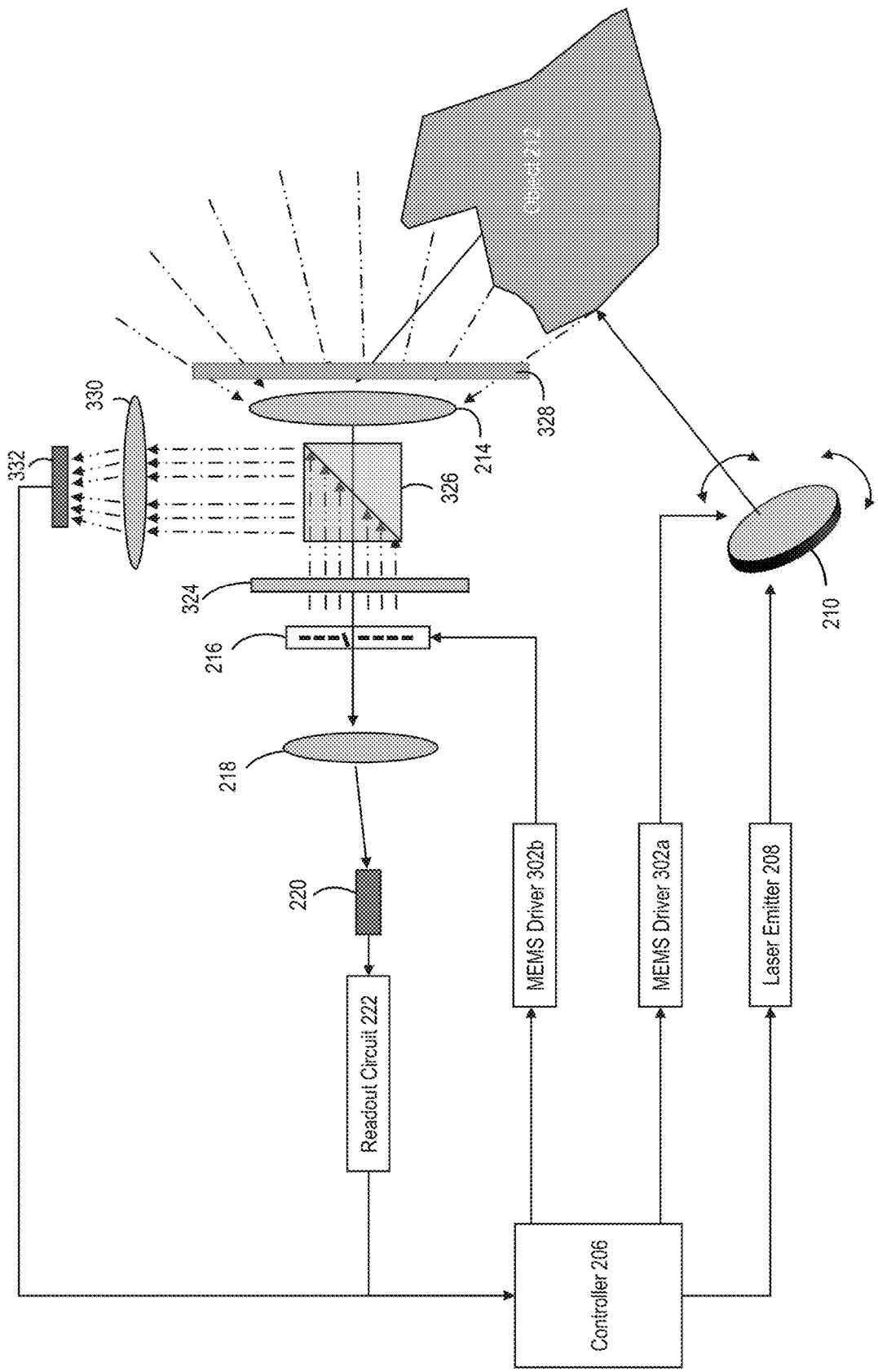
FIG. 3B illustrates a block diagram of another exemplary LiDAR system containing a micro shutter array and an image sensor, according to embodiments of the disclosure.

FIG. 3A illustrates a block diagram of an exemplary LiDAR system 102 containing a micro shutter array, according to embodiments of the disclosure. FIG. 3B illustrates a block diagram of another exemplary LiDAR system containing a micro shutter array and an image sensor, according to embodiments of the disclosure. FIGS. 3A-3B will be described together.

As illustrated, LiDAR system 102 may include a scanner 210 coupled to a laser emitter 208. In addition, LiDAR system 102 may also include a micro-electromechanical system (MEMS) driver 302a that drives scanner 210 to rotate. A controller 206 may provide a control signal to MEMS driver 302a for controlling the rotation of scanner 210 to achieve two-dimensional scanning. For instance, controller 206 may control scanner 210 to steer laser beams emitted by laser emitter 208 towards an object(s) 212, which may be a far-field object surrounding LiDAR system 102.

As illustrated, LiDAR system 102 may further include a receiving lens 214, a condenser lens 218, and a micro shutter array 216 disposed between receiving lens 214 and condenser lens 218. In addition, LiDAR system 102 may also include a photodetector 220 and readout circuit(s) 222, which is coupled to controller 206. In some embodiments, LiDAR system 102 may further include a MEMS driver 302b coupled to micro shutter array 216, where MEMS driver 302b may drive the micro shutter elements included in micro shutter array 216 to individually open or close according to a predefined pattern, as further described below.

Receiving lens 214 may collimate the optical signals received from the environment. In some embodiments, to improve the detection range of LiDAR system 102, e.g., to detect a building that is 100 m or higher surrounding the LiDAR system, the FOV of receiving lens 214 may be configured to be large. With the increased FOV, when receiving the optical signals from the environment, besides the laser beams reflected from objects (e.g., far-field object (s) 212), receiving lens 214 may also receive a large amount of ambient light from the environment. For instance, direct or indirect sunlight reflected off far-field objects may be also received by receiving lens 214. The larger the FOV of the receiving lens, the more ambient light received from the environment, which introduces more noise for backend processing. Accordingly, the detection accuracy is reduced if more ambient light is detected by photodetector 220 of LiDAR system 102.

Micro shutter array 216 may block the majority of the ambient light from being detected by photodetector 220, and thus increases the detection accuracy of LiDAR system 102 even when the FOV of the receiving lens is large. As illustrated, micro shutter array 216 may be disposed along the light path of the returned optical signals after receiving lens 214. The optical signals, including the returned laser beams and the ambient light, may be collimated and directed by receiving lens 214 towards micro shutter array 216. Micro shutter array 216 may serve as a filter to allow the returned laser beams to pass through while blocking most of the ambient light. To achieve such a filtering effect, micro shutter array 216 may include a plurality of micro shutter elements arranged in a two-dimensional array, where each micro shutter element may include a coated reflective surface facing receiving lens 214. A micro shutter element can be in one of an open state for allowing light and laser beams to pass through or in a closed state for blocking or reflecting back the ambient light or other optical signals. In the closed state, the micro shutter element is covered by the reflective coating such that the laser beam incident on the element will be reflected. In the open state, the reflective coating on the micro shutter element will be temporarily removed, and thus the incident laser beam can pass through. At any moment during a scanning process, the majority of the micro shutter elements may remain closed and thus the majority of the ambient light may be reflected back towards receiving lens 214. Only a spatially selected portion of micro shutter elements may be in an open state for allowing the returned laser beams to pass through the micro shutter array. A very limited portion of the ambient light, if any, may also pass through the spatially selected portion of the micro shutter elements in the open state. The spatial location of the selectively opened portion may correspond to the incident position of the returned laser beam, which may be further determined by the angular direction at which a scanner of the LiDAR system is pointing during a scanning process.

As described earlier, the ambient light reflected by micro shutter array 216 may also contain information of the far field, which may be also used for objection detection or environmental sensing of the objects in the far field. Accordingly, the disclosed LiDAR system 102 may further include a set of optical elements and a corresponding image sensor configured to detect the objects in the far field by sensing the ambient light reflected by micro shutter array 216, as shown in FIG. 3B. For instance, as illustrated in the figure, the disclosed LiDAR system may include a polarizer 328 for polarizing the ambient light into a linearly polarized light, a beam splitter 326 to allow the linearly polarized light to pass through without changing a direction, and a quarter-wave plate 324 for converting the linearly polarized light into a circularly polarized light before being incident on micro shutter array 216. When the circularly polarized light is incident on micro shutter array 216, while a certain amount of the circularly polarized light may pass through the opened portion of micro shutter array 216 as described above, the majority of the circularly polarized light may be reflected back by the reflective surface of micro shutter array 216. During the reflection, the circularly polarized light may reverse its handedness. In return, the opposite-handedness circularly-polarized light may be converted to the opposite linearly polarized light by quarter-wave plate 324. The opposite linearly polarized light, when passing through the beam splitter 326 again, may be reflected by the beam splitter 326 due to the reversed handedness of the linearly polarized light, and thus change its direction, as shown in FIG. 3B. The reflected linearly polarized light may be concentrated or focused by imaging lens 330, and the concentrated or focused light may be then detected by image sensor 332. In some embodiments, the ambient light reflected off objects in the environment may include information of the objects in the environment, which, when captured by image sensor 332, may provide texture information of the objects in the environment.

It is to be noted that components illustrated in FIGS. 3A-3B are merely for illustrative purposes, and not for limitation. The arrangement of these components is not limited to the configuration illustrated in FIGS. 3A-3B, but can be in other configurations. For instance, in FIG. 3B, polarizer 328 may be disposed behind receiving lens 214 along the light path of the returning laser beams. In addition, beam splitter 326 may be in other shapes or structures different from that shown in FIG. 3B.

Figure 4:
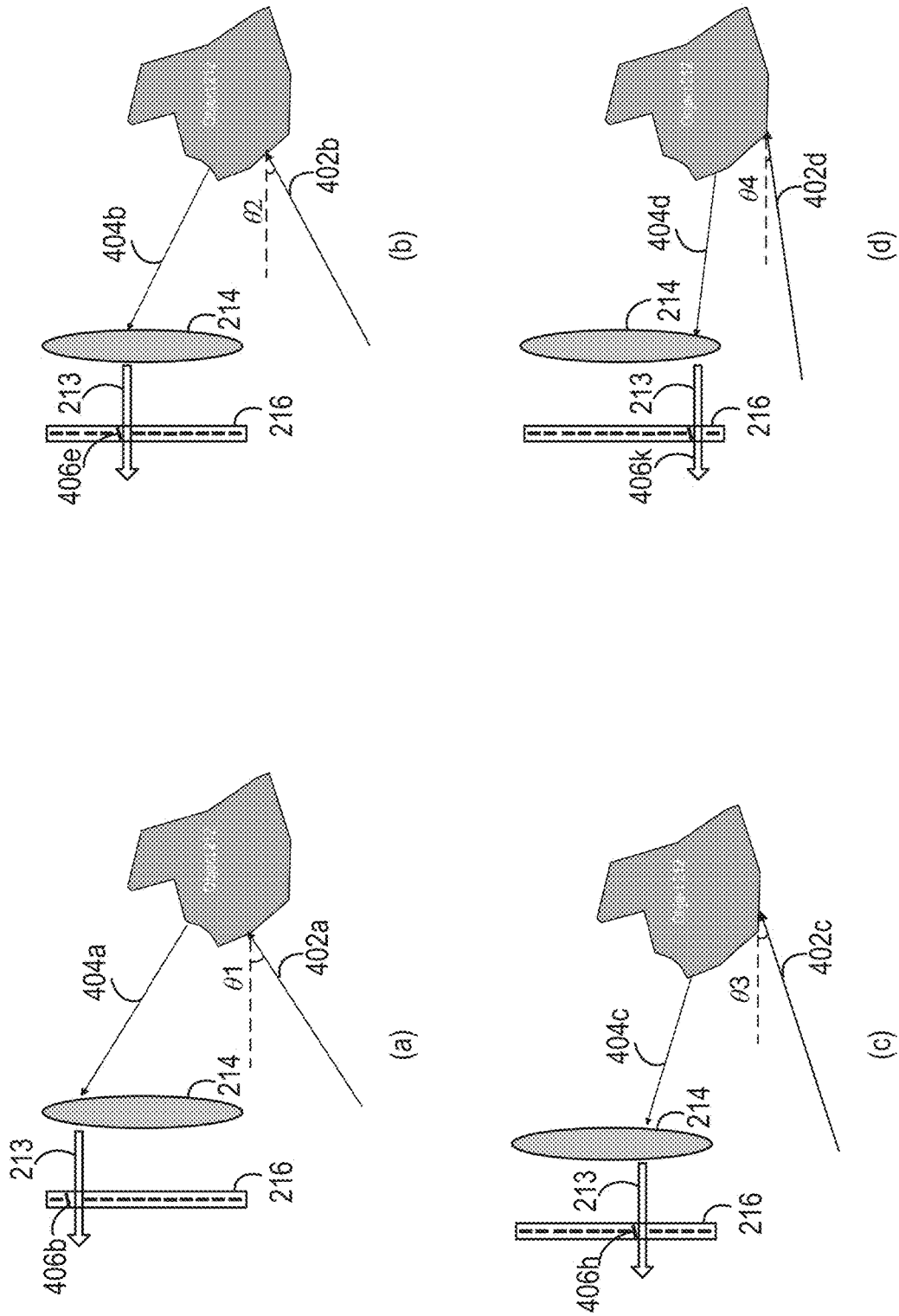
FIG. 4 illustrates a schematic diagram of an exemplary operation of a micro shutter array, according to embodiments of the disclosure.

FIG. 4 illustrates a schematic diagram of an exemplary operation of a micro shutter array 216, according to embodiments of the disclosure. As illustrated, micro shutter array 216 may sit along a light path of the optical signals returning from the environment. The optical signals impinging on receiving lens 214 may be first collimated onto micro shutter array 216, where the optical signals may include both the returned laser beams and the ambient light. A small portion of micro shutter array 216 may be controlled to open only when a returned laser beam is incident on that portion. In one example, as illustrated in parts (a)-(d) in FIG. 4, when returned laser beams are incident at different positions on the micro shutter array at different time points during a scanning process, the micro shutter element(s) corresponding to that position may be controlled to open. The exact position where the returned laser beam is incident on the micro shutter array at each time point may be determined by the angular direction or the incident angle at which the scanner of the LiDAR system is pointing at a far-field object at that time point during the scanning process.

For instance, in part (a) of FIG. 4, at time point t1 of a scanning process, the angular direction (or incident angle) at which the scanner of the LiDAR system is pointing at object(s) 212 is indicated by arrow 402a (or incident angle θ1). The returned laser beam reflected off far-field object(s) 212 is indicated by arrow 404a, which, after collimation by the receiving lens 214, may be incident on the micro shutter array at a position corresponding to a micro shutter element 406b. That is, the angular direction or incident angle θ1 of the laser beam directed by the scanner determines the corresponding position or the exact micro shutter element(s) 406b at which the returned laser beam is incident on the micro shutter array. Similarly, in part (b) of FIG. 4, the angular direction 402b or incident angle θ2 of a laser beam at which the scanner of the LiDAR system is pointing at object(s) 212 determines the returned laser beam 404b and the corresponding micro shutter element 406e at which the returned laser beam is incident on the micro shutter array, in part (c) of FIG. 4, the angular direction 402c or incident angle θ3 of a laser beam at which the scanner of the LiDAR system is pointing at object(s) 212 determines the returned laser beam 404c and the corresponding micro shutter element 406h at which the returned laser beam is incident on the micro shutter array, and in part (d) of FIG. 4, the angular direction 402d or incident angle θ4 of a laser beam at which the scanner of the LiDAR system is pointing at object(s) 212 determines the returned laser beam 404d and the corresponding micro shutter element 406k at which the returned laser beam is incident on the micro shutter array. That is, when the angular direction or the incident angle at which the scanner of the LiDAR system is pointing at a far-field object is determined, the corresponding micro shutter element(s) at which the returned laser beam is incident on the micro shutter array is also determined. Since the angular direction or the incident angle at which the scanner of the LiDAR system is pointing at a far-field object at each time point can be predefined, e.g., by defining the scanning pattern of the scanner of the LiDAR system, the corresponding micro shutter element(s) at which the returned laser beam is incident on the micro shutter array at each time point may be also determined consequentially. That is, a pattern in which the micro shutter elements are controlled to open may match a scanning pattern in which the emitted laser beams are directed towards the environment (e.g., towards far-field objects), as further described in FIG. 5.

Figure 5:
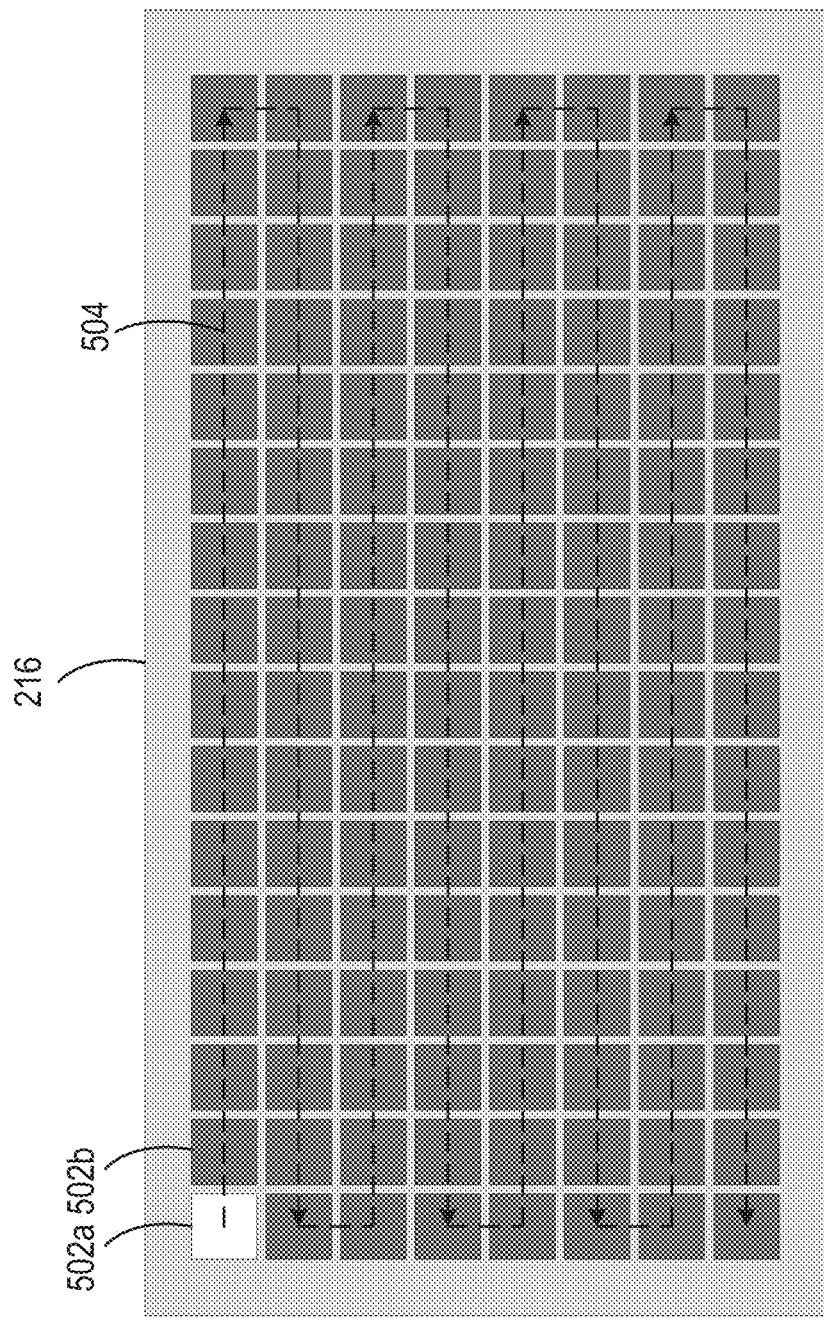
FIG. 5 illustrates a schematic diagram of an exemplary separation of ambient light from returned laser beams, according to embodiments of the disclosure.

FIG. 5 illustrates a schematic diagram of an exemplary view of sequentially opened micro shutter elements in micro shutter array 216, according to embodiments of the disclosure. As illustrated, at one time point during a scanning process, a micro shutter element 502a may be controlled to open since the returned laser beam is incident right on the micro shutter element 502a. As the scanner continuously scans following a predefined pattern (e.g., a two-dimensional scanning pattern with the horizontal scanning as a fast axis and the vertical scanning as a slow axis), the micro shutter element that is controlled to open may continue to shift from micro shutter element 502a along a direction as indicated by the arrowed dotted line 504. For instance, at a next time point of the scanning process, micro shutter element 502b is controlled to open. Meanwhile, micro shutter element 502a is controlled to close at that time point. That is, at each time point, only micro shutter element(s) corresponding to the incident returned laser beam is controlled to open, while the remaining micro shutter elements in the micro shutter array remain closed. Therefore, during the scanning process, the micro shutter elements in the micro shutter array are controlled to open sequentially, following a pattern matching the scanning pattern that the scanner follows.

In some embodiments, as shown in FIG. 5, micro shutter array 216 may include multiple rows of micro shutter elements. The micro shutter elements may be sequentially open row by row, e.g., the first row, followed by the second row, followed by the third row, and so on. More specifically, the scanner may use a zig-zag scanning pattern, and accordingly, as shown by FIG. 5, the micro shutter elements may be sequentially open row by row in a zig-zag pattern, e.g., from left to right in the first row, then from right to left in the second row, then from left to right again in the third row, and so on. A zig-zag scanning pattern may allow the scanner to continuously increase/decrease of scanning angle without large jumps. If the scanner of the LiDAR system follows a different scanning pattern (e.g., a two-dimensional scanning pattern with the horizontal scanning as a slow axis and the vertical scanning as a fast axis, or a one-dimensional scanning pattern), the pattern in which the micro shutter elements are controlled to sequentially open may also be changed accordingly.

In this way, it can be ensured that only the portion of the micro shutter array corresponding to the returned laser beam be controlled to open at any given time point while all other micro shutter elements remain closed. This then blocks most of the ambient light without affecting the detection of the returned laser beams during a scanning process by the LiDAR system, thereby separating the majority of the ambient light from the returned laser beams. This allows the ambient light and the returned laser beams to be separately detected in a same receiver of the LiDAR system, as further described in detail in FIG. 6.

Figure 6:
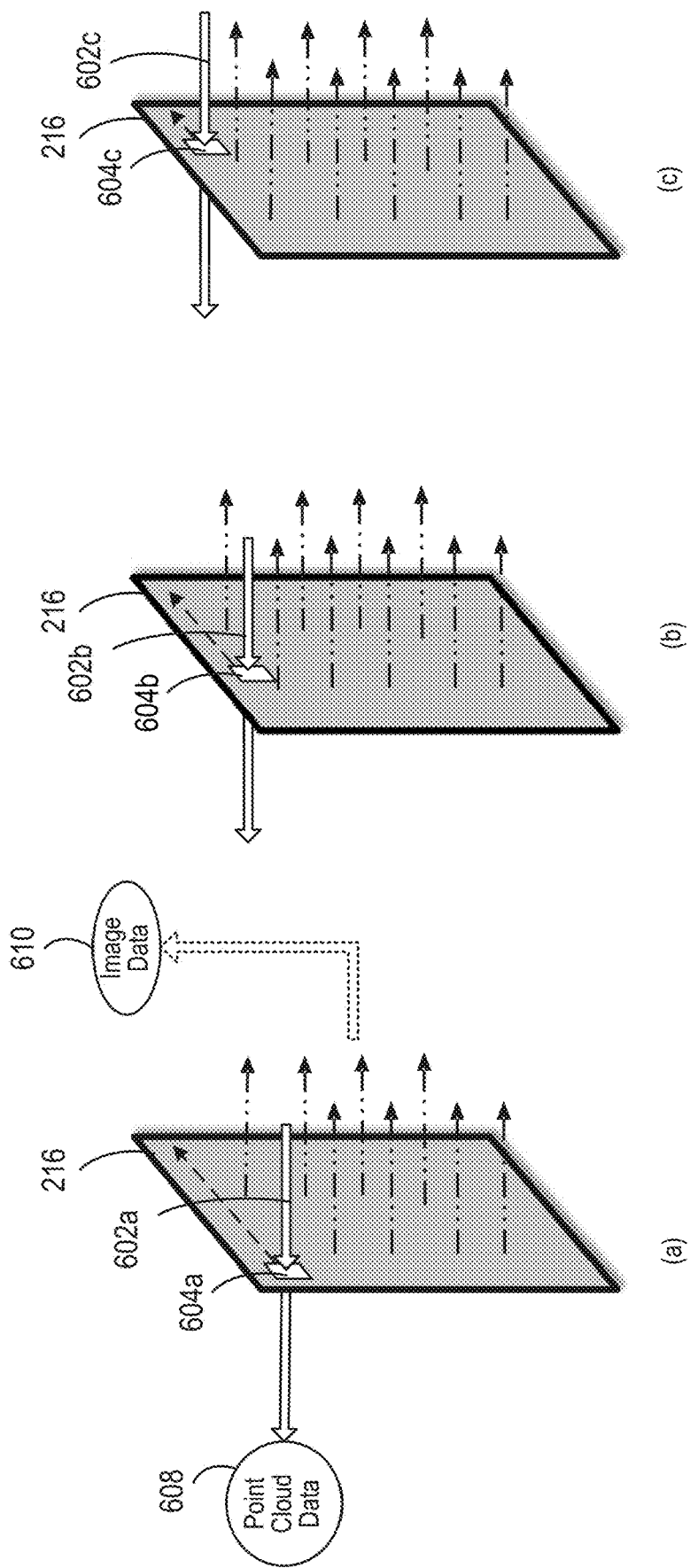
FIG. 6 illustrates a schematic diagram of another exemplary view of sequentially opened micro shutter elements in a micro shutter array, according to embodiments of the disclosure.

FIG. 6 illustrates a schematic diagram of another exemplary view of sequentially opened micro shutter elements in a micro shutter array, according to embodiments of the disclosure. As described above, when a returned laser beam is incident on micro shutter array 216, the corresponding portion of micro shutter array 216 may be controlled to open, to allow the returned laser beam to pass through micro shutter array 216. For instance, in part (a) of FIG. 6, a returned laser beam 602a may be incident on micro shutter array 216 at one time point during a scanning process. At that time point, a portion 604a of micro shutter array 216 corresponding to the incident location of returned laser beam 602a may be controlled to open, to allow returned laser beam 602a to pass through micro shutter array 216. In some embodiments, the size of the opened portion 604a may be equivalent to or larger than the size of returned laser beam 602a so that returned laser beam 602a passes through micro shutter array 216 without an optical loss. When the scanning process continues, the returned laser beam keeps changing the incident position on micro shutter array 216 due to the changing scanning direction. For instance, at a subsequent time point, a returned laser beam 602b may be incident on a location corresponding to a portion 604b of micro shutter array 216. The portion 604b of micro shutter array 216 may be then controlled to open at that time point, to allow returned laser beam 602b to pass through portion 604b of micro shutter array 216, as shown in part (b) of FIG. 6. Part (c) of FIG. 6 shows an even later time point during a scanning process, at which a returned laser beam 602c may be incident on micro shutter array 216 at a location corresponding to a portion 604c of micro shutter array 216, which is controlled to open to allow returned laser beam 602c to pass through micro shutter array 216 when returned laser beam 602c is incident on micro shutter array 216. Accordingly, through controlling spatially selected portions of micro shutter array 216 to open sequentially, the returned laser beams may be controlled to pass through micro shutter array 216, to be detected by photodetector 220 without an optical loss. The returned laser beams detected by photodetector 220 may be used for the construction of point cloud data for the environment during the scanning process, e.g., for determining the depth information of objects in the environment.

When returned laser beam 602a, 602b, or 602c is incident on micro shutter array 216, the received ambient light may be also incident on micro shutter array 216. Different from returned laser beams that consistently change incident locations on micro shutter array 216, the received ambient light remains incident on the entire area of micro shutter array 216 during a scanning process. Therefore, the received ambient light covers a much larger area than returned laser beams when being incident on micro shutter array 216. Accordingly, at any time point during a scanning process, since only a portion of micro shutter array 216 corresponding to the incident location of a returned laser beam is controlled to open, only a tiny portion of the received ambient light passes through micro shutter array 216, and the majority of the received ambient light will be reflected back, as shown in FIG. 6. For instance, in part (a) of FIG. 6, only a small portion of the received ambient light will pass through portion 604a of micro shutter array 216 at one time point during a scanning process. Similarly, in parts (b) and (c) of FIG. 6, only a small portion of the received ambient light will pass through portion 604b or 604c respectively at one time during a scanning process, and the majority of the received ambient light will not pass through micro shutter array 216, but rather be reflected back by micro shutter array 216, e.g., by the coated reflective surface of micro shutter elements included in micro shutter array 216. The reflected ambient light may be eventually redirected by beam splitter 326 and further detected by image sensor 332, as described earlier in FIG. 3B. The image sensor 332 may thus acquire image data 608 including the texture information of the objects in the environment surrounding the LiDAR system. The image data 608 may be used alone or may be fused with point cloud data 610 in the detection of the objects.

It is to be noted that while only one micro shutter element is controlled to open at one time point in the illustrated FIGS. 4-6, in some embodiments, if the returned laser beam, or more specifically a focused spot, has a size larger than one micro shutter element when the returned laser beam is incident on the micro shutter array, two or more micro shutter elements may be controlled to open simultaneously, to ensure that the returned laser beam passes through the micro shutter element without a signal loss. Regardless of whether a single micro shutter element or more than one micro shutter elements are controlled to open at each time point, given the large number of micro shutter elements in a micro shutter array for the disclosed LiDAR system with a large receiving optics FOV, the majority (e.g., over 99%) of the micro shutter elements in the micro shutter array remain closed, and thus the majority (e.g., over 99%) of the ambient light is blocked. That is, the signal-to-noise ratio may still maintain high, allowing detection of the environment at high accuracy with a large detection range. The specific control process of the micro shutter array to achieve the expected benefits is described more in detail below in FIG. 7.

Figure 7:
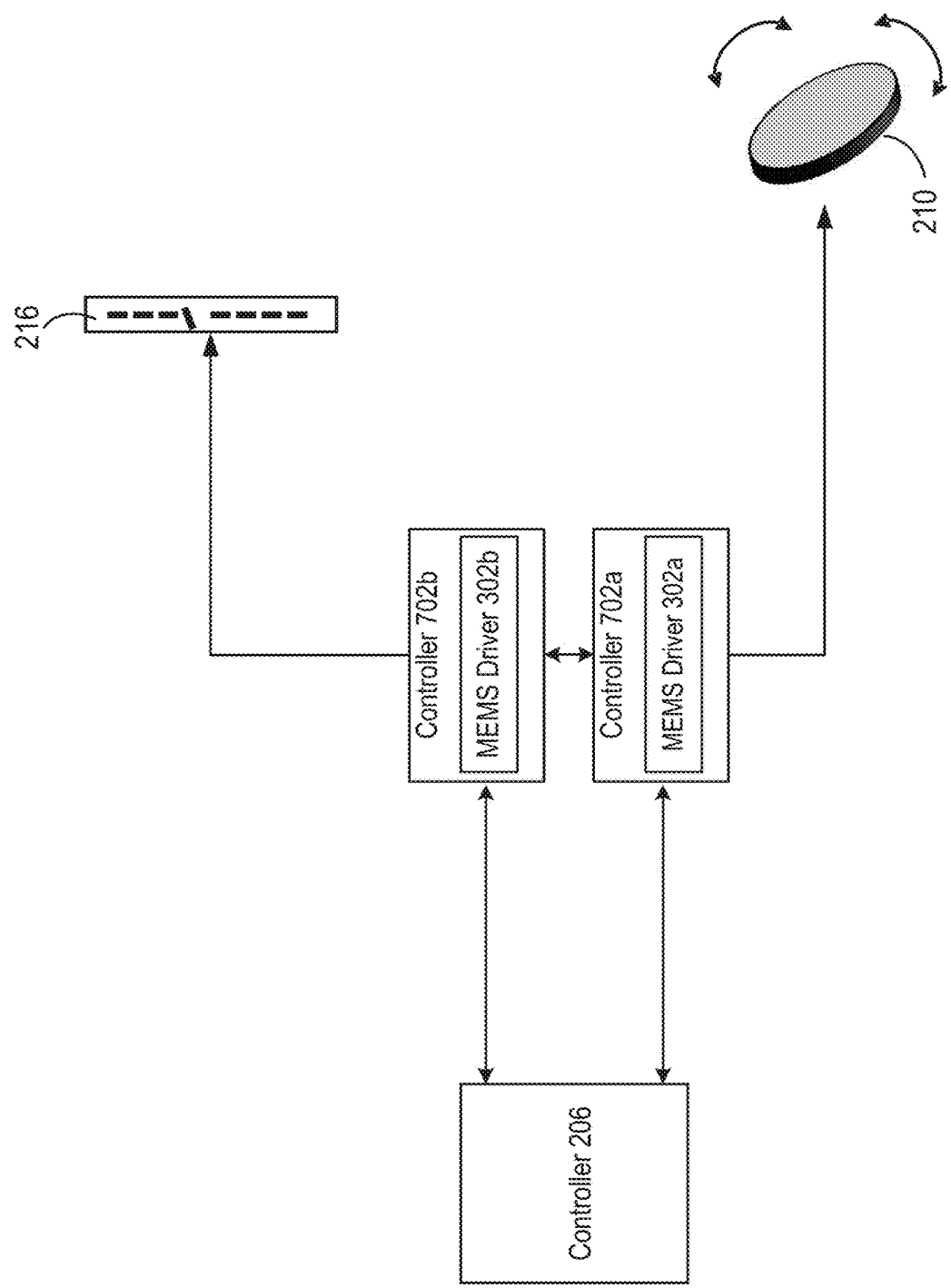
FIG. 7 illustrates a schematic diagram of an exemplary control mechanism for controlling a micro shutter array, according to embodiments of the present disclosure.

FIG. 7 illustrates a schematic diagram of an exemplary control mechanism for controlling micro shutter array 216, according to embodiments of the present disclosure. As previously described, scanner 210 of LiDAR system 102 may be driven by a MEMS driver 302a to rotate, to achieve different scanning patterns. In some embodiments, MEMS driver 302a may receive instructions from its integrated controller 702a or controller 206 coupled to MEMS driver 302a, where the instructions may instruct MEMS driver 302a to drive scanner 210 to rotate according to a predefined pattern. In some embodiments, MEMS driver 302a may be a part of controller 702a. In alternative embodiments, there is no controller 702a in the LiDAR system, and MEMS driver 302a may directly communicate with controller 206 to receive instructions from controller 206.

Similarly, a MEMS driver 302b may be coupled to micro shutter array 216, to drive a micro shutter element to open or close. In some embodiments, multiple MEMS drivers 302b may be included in the LiDAR system, where each MEMS driver 302b may control only one or just a few micro shutter elements included in the micro shutter array 216. In some embodiments, different MEMS drivers may be employed to drive a micro shutter element to open or close. For instance, a micro shutter element may be controlled, e.g., by a comb-drive-based driver, to slide behind or in front of another micro shutter element(s), so as to "open" the micro shutter element to allow a returned laser beam to pass through a path (or a "hole") opened by the micro shutter element.

Figure 8A:
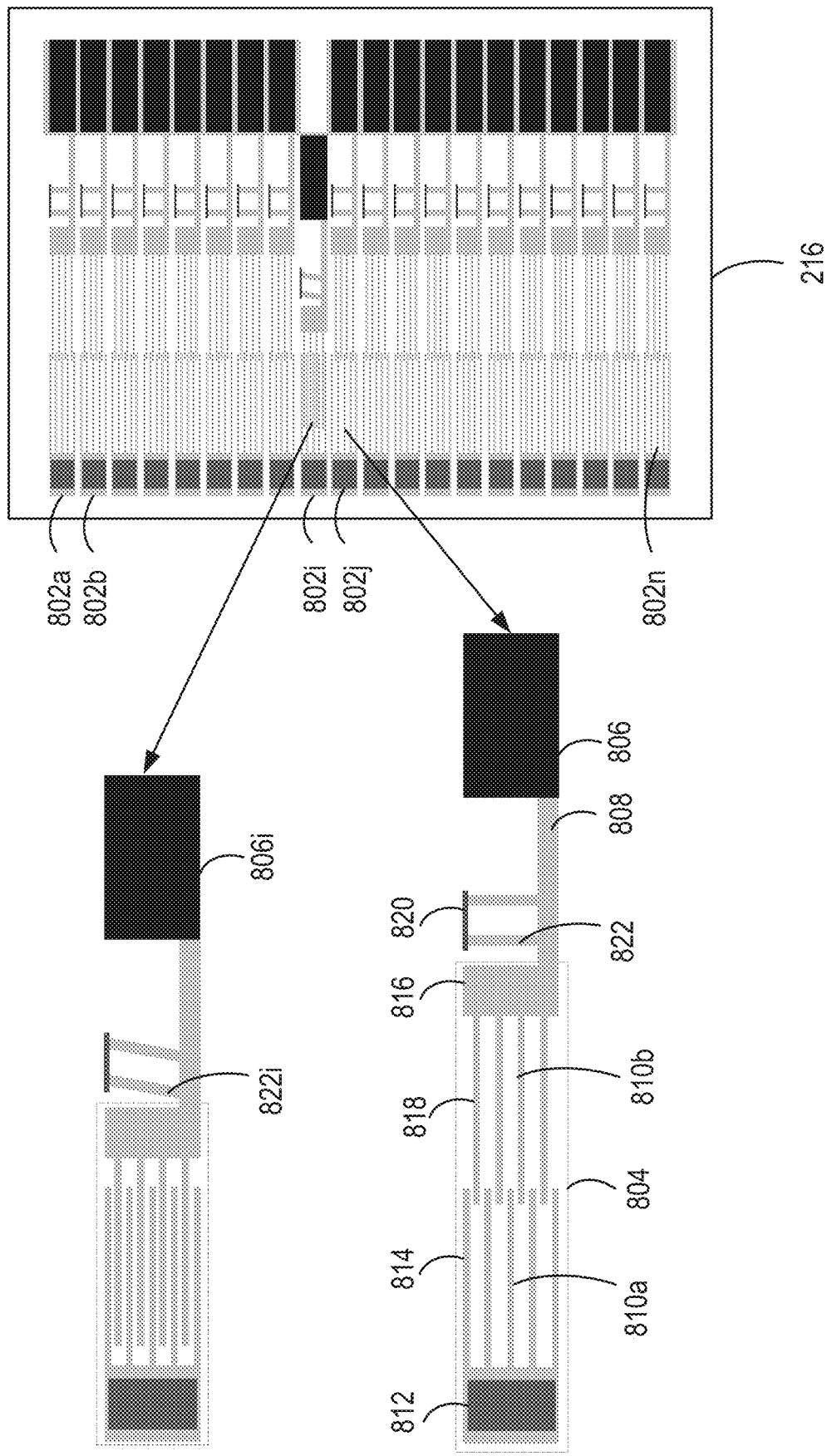
FIG. 8A illustrates a micro shutter array including an exemplary comb-drive based driver, according to embodiments of the disclosure.

FIG. 8A illustrates micro shutter array 216 including an exemplary comb-drive based driver, according to embodiments of the disclosure. The comb-drive based driver may include an array of electrostatic comb drives (referred as comb drives for simplicity hereafter) individually coupled to the array of micro shutter elements in micro shutter array 216, so that each micro shutter element can be independently and separately actuated to "open" and "close." For simplicity, FIG. 8A illustrates only one row of micro shutter elements and their respective electrostatic comb drives. However, it is contemplated that the plurality of micro shutter elements may be arranged in a two-dimensional or a three-dimensional array if properly configured. In addition, for ease of illustration, the micro shutter array 216 is not shown to scale.

As illustrated in FIG. 8A, micro shutter array 216 may include a plurality of micro shutter elements 802a, 802b, . . . , 802n (collectively or individually may be referred to as "micro shutter element 802") arranged in an array. Each micro shutter element 802 in the micro shutter array 216 may include a comb drive 804 and a light shutting unit 806 attached to comb drive 804 through an elongated arm 808. Each comb drive 804 may include a first comb 810a and a coupled second comb 810b. First comb 810a may include a first anchor 812 and a first set of teeth 814 fixed to the first anchor, and second comb 810b may include a second anchor 816 and a second set of teeth 818 fixed to the second anchor. Consistent with some embodiments, first anchor 812 may be fixed to a substrate (not shown in the figure) that holds and supports micro shutter array 216, and thus is static and is not movable. On the other hand, second anchor 816 is not fixed to the substrate, and thus is movable with respect to first anchor 812. For instance, second anchor 816 may move away from or towards first anchor 812. The movement of the second anchor or the second comb may be driven by a force applied to comb drive 804, as further described in FIG. 8B.

Consistent with some embodiments, each tooth in the first or second set of teeth 814/818 may have a predefined width or a width range. Further, the two sets of teeth 814/818 may be also tightly spaced and interleaved with each other when the two combs move close to each other. Accordingly, a gap between adjacent comb teeth may be spaced in a way to ensure that there is no contact between the teeth during the movement of second comb 810b. In some embodiments, the smoothness of the teeth may also be controlled, to allow for tightly-packed formation of the interleaved combs. This may ensure the overall size of the whole comb drive 804 to be scaled down to some extent, which is beneficial for the construction of micro shutter array 216, considering that a good number of micro shutter elements may be arranged in a compact space of a receiver of a LiDAR system.

In some embodiments, the length of each tooth, the overlap between the first and the second set of teeth 814/818 in the absence of force (e.g., shown in the example of micro shutter element 802j in FIG. 8A), and the number of teeth on each comb 810a/810b may be selected in consideration of the desired force developed between the two combs 810a and 810b, as well as the desired travel distance of light shutting unit 806. According to one embodiment, the length of each tooth in the first and second sets of teeth 814 and 8818 may be at least longer than the width or the latitudinal travel distance of light shutting unit 806 during each movement.

As illustrated in FIG. 8A, micro shutter element 802 may further include a third anchor 820, which may be also a stationary anchor fixed to the substrate to support and hold the micro shutter array 216. Further, on one side surface of third anchor 820 facing elongated arm 808, one or more beams 822 may be disposed between third anchor 820 and elongated arm 808. Beams 822 may provide support when second comb 810b and light shutting unit 806 move horizontally. While two beams 822 are illustrated in FIG. 8A, the number of beams 822 included in a micro shutter element 802 is not limited and can be one, three, or any other suitable numbers.

In some embodiments, a beam 822 may include a spring structure that deflects when dragged by the movement of second comb 810b towards first comb 810a, as shown by beams 822i in micro shutter element 802i in FIG. 8A. The spring structure may act as a spring to restore second comb 810b and the attached light shutting unit 806 to their default positions in the absence of the applied force. In the illustrated micro shutter element 802j, the beams 822 may not deflect when light shutting unit 806 is in a default position (i.e., a position that does not allow an optical signal to pass through from its location in the micro shutter array, and also a position in the absence of force applied to second comb 810b).

In some embodiments, beam 822 may not include a spring structure or other similar structures, and thus the movement of second comb 810b away from first comb 810a may be also controlled by the force (e.g., a reversal force) applied to second comb 810b. That is, both the movements of second comb 810b towards and away from first comb 810a may be controlled by the force applied to comb drive 804. In such a scenario, since beams 822 are disposed between the stationary third anchor 820 and movable elongated arm 808, to allow beams 822 to follow the movement of elongated arm 808, beams 822 may be rotationally fixed to the stationary third anchor 820 and/or movable elongated arm 808. In some embodiments, the length of beams 822 may be selected to be long enough to accommodate the travel distance of elongated arm 808, while not too long to consume much space of micro shutter array 216.

As previously described, micro shutter element 802 may further include a light shutting unit 806. Light shutting unit 806 may be a piece of reflective shutter/mirror with a top surface coated with a reflective material. The reflective material may have high reflectivity, e.g., over 95%, to ensure that the ambient light coming from the environment do not pass through the light shutting unit when it is in the default position. In some embodiments, absorptive materials may be used instead of the reflective material. For instance, under certain circumstances, an optical filter may be used to coat light shutting unit 806. Although illustrated as a rectangular shape in FIG. 8A, light shutting unit 806, or at least its coating surface, may be in certain other shapes, such as square, circle, ellipse, etc.

From the above descriptions, it can be seen that micro shutter element 802 may include a light shutting unit 806 coupled to a comb drive 804 capable of moving light shutting unit 806 between a default position (i.e., a position corresponding to a closed state of the corresponding micro shutter element 802, e.g., micro shutter element 802*j* in FIG. 8A) and a retracted position (i.e., a position corresponding to an open state of the corresponding micro shutter element 802, e.g., micro shutter element 802*i* in FIG. 8A). In the illustrated embodiment in FIG. 8A, light shutting unit 806*i* lies in the retracted position, therefore, the laser beam in the optical signal returning from the environment will not be reflected by light shutting unit 806*i* in the retracted position, but rather pass through the corresponding area previously covered by light shutting unit 806*i*. For all other light shutting units 806, since these units remain at the default positions, the ambient light contained in optical signal returning from the environment will be reflected off and will not pass-through micro shutter array 216 at the respective locations. In this way, micro shutter array 216 may allow the optical signal to pass through only micro shutter element 802*i*, but not other micro shutter elements in the array, thereby achieving spatially-selective optical signal pass-through. Specific details regarding how to control switching of light shutting unit 806 from a default position to a retracted position will be provided hereinafter with reference to FIG. 8B.

FIG. 8B illustrates a schematic diagram of an exemplary switching mechanism of a micro shutter element, according to embodiments of the disclosure. As illustrated, the comb drive 804 in micro shutter element 802 may be coupled to an anode 852 and a cathode 854. For instance, first anchor 812 may be electrically connected to anode 852, while second anchor 816 may be electrically connected to cathode 854. The coupled anode 852/cathode 854 may apply a voltage differential between two combs 810*a* and 810*b*, thus creating a force that attracts the two combs to one another. Since first comb 810*a* is stationary while second comb 810*b* is movable, second comb 810*b* may move to first comb 810*a* due to the created force. The lateral movement of second comb 810*b* may thus drag light shutting unit 806 to retract from its default position, as exhibited by the lower micro shutter element 802 in FIG. 4.

When the voltage differential applied to the two combs 810*a* and 810*b* pauses or terminates, second comb 810*b* may return to its default position in the absence of applied force, and thus light shutting unit 806 returns to its default position, blocking the light path for the optical signal at its corresponding location. As previously described, in some embodiments, spring structures in beams 822 may drag elongated arm 808, to move second comb 810*b* and light shutting unit 806 back to their default positions. Alternatively, a reverse force may be applied by the coupled anode 852/cathode 854 to move second comb 810*b* and light shutting unit 806 back to their default positions. Other mechanisms to reverse the movements of second comb 810*b* and lighting shutting unit 806 are also possible and are contemplated here. In some embodiments, structures or configurations other than comb drive 804 may be also applied to control the movement of light shutting unit 806.

As also illustrated in FIG. 8B, the anode 852 and cathode 854 may be coupled to a controller 702*b* that controls the voltage differential applied to comb drive 804. For instance, controller 702*b* may control what type and/or what level of voltage differential should be applied to comb drive 804, and/or at what time the voltage differential should be applied, thereby precisely controlling the movement and switching of light shutting unit 806.

In some embodiment, controller 702*b* may be a controller for all micro shutter elements 802 in micro shutter array 216. By controlling each micro shutter element 802 in micro shutter array 216, controller 702*b* may precisely switch each micro shutter element 802 between an open and closed state, and thus generate a spatial pattern for filtering optical signal through micro shutter array 216. For instance, controller 702*b* may control the micro shutter elements in micro shutter array 216 to sequentially open, as described in FIGS. 4-6.

Alternatively, in some embodiments, a different comb drive-based rotation mechanism may be employed to drive a micro shutter element to rotate around a hinge (like a door or window) so as to open or close the micro shutter element. For example, the driver may rotate the micro shutter element out of a plane incident to the laser beam to allow the laser beam to pass through. Other MEMS driving mechanisms to open a micro shutter element are also possible and are contemplated.

Similar to MEMS driver 302*a*, MEMS driver 302*b* may be also integrated in a controller 702*b* and/or coupled to controller 206, which provides instructions to MEMS driver 302*b* to drive a micro shutter element to open or close during a scanning process. For instance, the instructions may instruct whether and/or when to open/close a specific micro shutter element, and which pattern should follow when multiple micro shutter elements are sequentially opened. Controller 702*b* (or controller 206 if there is no controller 702*b*) may communicate with controller 702*a* (or controller 206 if there is no controller 702*a*), to identify the scanning pattern that the scanner follows in a scanning process, and then determine the pattern in which the micro shutter elements should be sequentially opened, so that a returned laser beam can timely pass through an opened portion of the micro shutter array. Based on the determined pattern for sequentially opening the micro shutter elements, a corresponding instruction may be generated and provided to MEMS driver 302*a*, which then drives the micro shutter array to open the micro shutter elements following the determined pattern. That is, through communication between the controllers controlling the operations of the scanner and the micro shutter array, the micro shutter elements may be controlled to open/close timely and sequentially, so as to achieve the filtering function of the micro shutter array.

In some embodiments, to assemble the whole FOV detection signal from the sequentially detected signals, a controller (e.g., controller 206) may record the location information of an opened micro shutter element when the intensity information of the returned laser beam passed through that micro shutter element is detected by the photodetector of the LiDAR system. By combining the location information and the corresponding light intensity information corresponding to each opened micro shutter element during a scanning process, the whole FOV detection signal may be then obtained for detecting far-field objects in the environment.

It is to be noted that, in some embodiments, not all micro shutter elements in a micro shutter array need to be open and/or closed during a scanning process. In some embodiments, the number of micro shutter elements constructed for a micro shutter array may be larger than the number of micro shutter elements required for covering the whole receiving optics FOV in a scanning process. For instance, in the micro shutter array illustrated in FIG. 5, maybe only about 90% of the illustrated micro shutter elements are sequentially opened and closed in a sensing process. It is also to be noted that the exact shape of a micro shutter array may not be as the shape shown in FIG. 5, but can be in other different shapes, such as a circle, square, and an ellipse, etc. In addition, the shape and size of each micro shutter array may also be different. For instance, a micro shutter element may be a circle, an ellipse, a rectangle, a square, etc. The size of a micro shutter element included in the micro shutter array may also vary. In some embodiments, the size of a micro shutter element may depend on the size of a returned laser beam or the size of a focused spot of the LiDAR system. For instance, for an emitted laser beam with a larger divergence, the size of a micro shutter element may be designed to be larger. Other factors that affect the size of a returned laser beam may also be considered. Once properly designed and/or optimized, a micro shutter array may be deployed by the corresponding biaxial scanning LiDAR system for actual applications, e.g., for optical sensing as described below.

Figure 9:
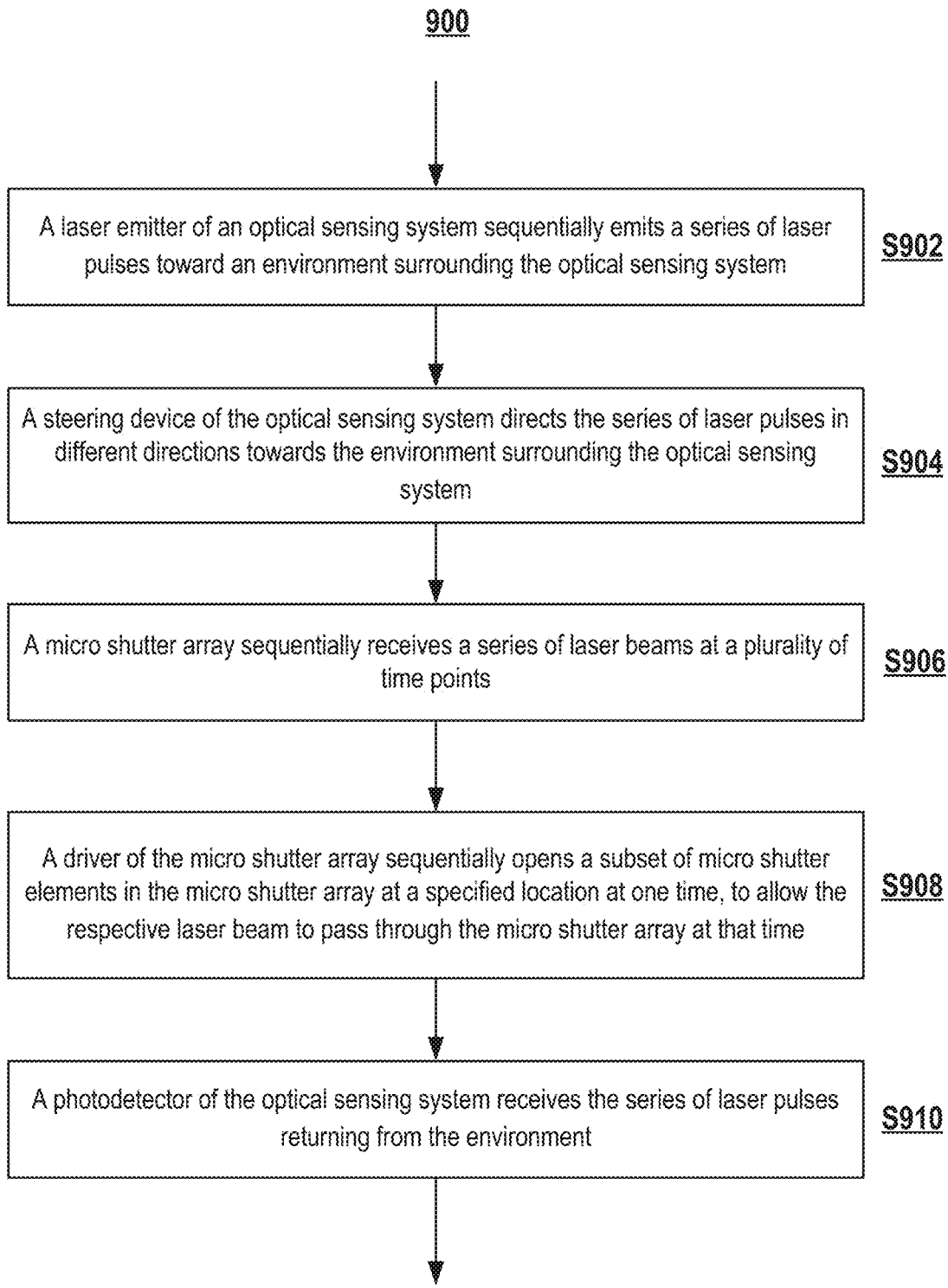
FIG. 9 is a flow chart of an exemplary optical sensing method of a LiDAR system containing a micro shutter array, according to embodiments of the disclosure.

FIG. 9 is a flow chart of an exemplary optical sensing method 900 performed by a LiDAR system containing a micro shutter array, according to embodiments of the disclosure. In some embodiments, method 900 may be performed by various components of LiDAR system 102, e.g., transmitter 202, receiver 204 containing micro shutter array 216, and/or controller 206. In some embodiments, method 900 may include steps S902-S910. It is to be appreciated that some of the steps may be optional. Further, some of the steps may be performed simultaneously, or in a different order than that shown in FIG. 9.

In step S902, an optical source (e.g., laser emitter 208) inside a transmitter of an optical sensing system (e.g., transmitter 202 of LiDAR system 102) may emit a series of optical signals for optical sensing of the environment. Here, the optical signals emitted by the optical source may have a predetermined beam size and divergence. In some embodiments, the emitted optical signals may have a high intensity and a large divergence, to allow detection of the objects in a wide range.

In step S904, a steering device of the optical sensing system (e.g., scanner 210 in transmitter 202 of LiDAR system 102) may steer the emitted optical signals toward the environment surrounding the optical sensing system. The steering device may steer the emitted optical signals according to a predefined pattern, so that different parts of the environment may be scanned over a short period of time. For instance, the emitted optical signals may be directed toward far-field objects in the environment according to a predefined scanning pattern (e.g., a two-dimensional scanning pattern). The objects in the environment may then reflect at least a portion of the optical signals toward the LiDAR system. In some embodiments, the LiDAR system may be biaxial and thus the returned optical signals may be directly directed towards a receiving lens (e.g., receiving lens 214) of the LiDAR system without being reflected by the steering device. The receiving lens may collimate the received optical signals. In some embodiments, to increase the detection range, the receiving lens FOV may be large. Therefore, a certain amount of ambient light may be also received by the receiving lens. The received ambient light may be also collimated by the receiving lens.

In step S906, a micro shutter array (e.g., micro shutter array 216) disposed after the receiving lens may receive the series of optical signals collimated by the receiving lens. The series of optical signals are received at a series of different time points during the LiDAR scan. Each optical signal may include a laser beam returned from the environment. As described above, when receiving the returned optical signals, the receiving lens may also receive the ambient light (unless specified, an optical signal throughout the specification may mean a laser light or an optical signal other than the ambient light). The received ambient light may be also collimated towards the micro shutter array. However, different from the returned optical signals that are incident only on a very small portion (e.g., less than 1%) of the micro shutter array, the received ambient light may be incident on the whole surface of the micro shutter array.

In step S908, a driver of the micro shutter array (e.g., the comb-drive based driver illustrated in FIGS. 8A-8B) may sequentially open a subset of micro shutter elements in a specific portion of the micro shutter array at one time, to allow the respective laser beam to pass through the micro shutter array at that time. As previously described, the micro shutter array may include a plurality of micro shutter elements, where each of the plurality of micro shutter elements may be in one of an open or closed state, and may include a reflective surface that reflects the ambient light if the micro shutter element is in the closed state. To allow the series of optical signals to pass through the micro shutter array, different portions of the micro shutter array may be sequentially opened, where each opened portion may allow a corresponding returned optical signal to pass through. The exact position at which a portion of the micro shutter array to be opened corresponds to an incident location of a returned optical signal on the micro shutter array. Since the returned series of optical signals follow the predefined scanning pattern when the signals are incident on the micro shutter array, the multiple portions included in the micro shutter array may be also controlled to open sequentially following the scanning pattern, to allow each returned optical signal to pass through each corresponding opened portion of the micro shutter array.

For instance, a micro shutter element may be controlled, e.g., by a comb-drive-based driver, to slide behind or in front of another micro shutter element(s), so as to "open" the micro shutter element to allow a returned laser beam to pass through a path (or a "hole") opened by the micro shutter element. Alternatively, in some embodiments, a different comb drive-based rotation mechanism may be employed to drive a micro shutter element to rotate the micro shutter element out of a plane incident to the laser beam to allow the laser beam to pass through.

Since only a small portion of the micro shutter array is controlled to open at any time point, only a very small portion of the ambient light, if any, may thus pass through the opened portion of the micro shutter array with the returned laser beam, and the majority of the collimated ambient light is blocked by the remaining closed majority portion of the micro shutter array. Therefore, even the receiving lens of the LiDAR system has a large FOV aimed at a large detection range, the signal-to-noise ratio may be maintained high for the disclosed LiDAR system due to the blocked ambient light by the micro shutter array.

In step S910, a photodetector (e.g., photodetector 220) of the LiDAR system may receive the series of optical signals sequentially passed through the micro shutter array. The series of optical signals may be sequentially received by the photodetector. When each optical signal is detected by the photodetector, the location information of the corresponding micro shutter element(s) allowing the pass-through of that optical signal is also received and recorded, e.g., by a controller of the LiDAR system. Therefore, after all the returned optical signals are detected, the detection signal for the entire receiving FOV can be then obtained by combining the sequentially detected signals. The whole FOV detection signal can then be used to generate a frame of image or map for the whole receiving lens FOV during an optical sensing process. The generated frame of an image or map may have a high accuracy due to the filtering effect of the micro shutter array that blocks the noise of the ambient light received by the large FOV receiving lens. The disclosed LiDAR system with a micro shutter array may thus achieve both a large detection range and a high accuracy during an optical sensing process.

Although the disclosure is made using a LiDAR system as an example, the disclosed embodiments may be adapted and implemented to other types of optical sensing systems that use receivers to receive laser beams not limited to laser beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A micro shutter array for filtering a series of optical signals at a plurality of time points, wherein the optical signal at each time point comprises a laser beam and ambient light, the micro shutter array comprising:
a plurality of micro shutter elements arranged in an array, wherein each micro shutter element comprises a reflective surface; and
a driver configured to sequentially open a subset of the micro shutter elements at a specified location at each time point to allow a respective laser beam to pass through the micro shutter array at that time point, wherein the remaining micro shutter elements of the micro shutter array are configured to reflect the ambient light at that time point.

2. The micro shutter array of claim 1, wherein the plurality of micro shutter elements are arranged in a two-dimensional array comprising a plurality of rows.

3. The micro shutter array of claim 2, wherein the driver is configured to sequentially open the micro shutter elements row by row.

4. The micro shutter array of claim 3, wherein the driver is configured to sequentially open the micro shutter elements in a zig-zag pattern.

5. The micro shutter array of claim 1, wherein each micro shutter element comprises a light shutting unit coated with a reflective mirror.

6. The micro shutter array of claim 1, wherein the driver is a micro-electromechanical system (MEMS) driver.

7. The micro shutter array of claim 1, wherein the driver is configured to pull each micro shutter element in the subset of the micro shutter elements laterally aside to create a path for the laser beam to pass through.

8. The micro shutter array of claim 7, wherein the driver comprises a plurality of electrostatic comb drives each configured to drive a micro shutter element in the micro shutter array.

9. The micro shutter array of claim 1, wherein the driver is configured to rotate each micro shutter element in the subset of the micro shutter elements out of a plane incident to the laser beam to allow the laser beam to pass through.

10. An optical signal filtering method, comprising:
receiving, at a micro shutter array, a series of optical signals at a plurality of time points, wherein the optical signal at each time point comprises a laser beam and ambient light, wherein the micro shutter array comprises a plurality of micro shutter elements arranged in an array and a driver configured to drive the plurality of micro shutter elements; and
sequentially opening, by the driver, a subset of the micro shutter elements at a specified location at each time point, to allow a respective laser beam to pass through the micro shutter array and partially reflect the ambient light with the remaining micro shutter elements of the micro shutter array at that time point.

11. The optical signal filtering method of claim 10, wherein the plurality of micro shutter elements are arranged in a two-dimensional array comprising a plurality of rows, wherein sequentially opening the subset of the micro shutter elements at a specified location at each time point further comprises:
sequentially opening the micro shutter elements row by row.

12. The optical signal filtering method of claim 11, wherein sequentially opening the micro shutter elements row by row further comprises:
sequentially opening the micro shutter elements in a zig-zag pattern.

13. The optical signal filtering method of claim 10, wherein the optical signal at each time point further comprises ambient light,
wherein the optical signal filtering method further comprises reflecting ambient light at each time point with the remaining micro shutter elements of the micro shutter array.

14. The optical signal filtering method of claim 10, wherein sequentially opening the subset of the micro shutter elements comprises pulling each micro shutter element in the subset of the micro shutter elements laterally aside to create a path for the laser beam to pass through.

15. The optical signal filtering method of claim 10, wherein sequentially opening the subset of the micro shutter elements comprises rotating each micro shutter element in the subset of the micro shutter elements out of a plane incident to the laser beam to allow the laser beam to pass through.

16. A receiver for optical sensing, comprising:
a micro shutter array configured to filter a series of optical signals at a plurality of time points, wherein the optical signal at each time point comprises a laser beam and ambient light, the micro shutter array comprising:
a plurality of micro shutter elements arranged in an array, wherein each micro shutter element comprises a reflective surface; and
a driver configured to sequentially open a subset of the micro shutter elements at a specified location at each time point to allow a respective laser beam to pass through the micro shutter array at that time point, wherein the remaining micro shutter elements of the micro shutter array are configured to reflect the ambient light at that time point; and a photodetector configured to detect the laser beam that passes through the micro shutter array at each time point.

17. The receiver of claim 16, wherein the driver is a micro-electromechanical system (MEMS) driver.

18. The receiver of claim 16, wherein the driver is configured to pull each micro shutter element in the subset of the micro shutter elements laterally aside to create a path for the laser beam to pass through.

19. The receiver of claim 16, wherein the driver is configured to rotate each micro shutter element in the subset of the micro shutter elements out of a plane incident to the laser beam to allow the laser beam to pass through.

* * * * *